United States Patent
Serna et al.

(10) Patent No.: US 10,362,617 B2
(45) Date of Patent: Jul. 23, 2019

(54) METHOD AND SYSTEM FOR A MOBILE COMMUNICATION DEVICE TO ACCESS SERVICES

(71) Applicant: TELEFONICA DIGITAL ESPAÑA, Madrid (ES)

(72) Inventors: Jorge Serna, Madrid (ES); John Neystadt, Madrid (ES); David Gallegos, Madrid (ES)

(73) Assignee: TELEFONICA DIGITAL ESPAÑA, Madrid (ES)

( * ) Notice: Subject to any disclaimer, the term of this patent is extended or adjusted under 35 U.S.C. 154(b) by 0 days.

(21) Appl. No.: 15/729,850

(22) Filed: Oct. 11, 2017

(65) Prior Publication Data
US 2018/0110081 A1    Apr. 19, 2018

(30) Foreign Application Priority Data
Oct. 14, 2016  (EP) .................................... 16382468

(51) Int. Cl.
*H04W 12/06* (2009.01)
*H04W 4/90* (2018.01)
(Continued)

(52) U.S. Cl.
CPC ......... *H04W 76/16* (2018.02); *H04L 63/0853* (2013.01); *H04L 65/1006* (2013.01);
(Continued)

(58) Field of Classification Search
CPC ...... H04W 12/02; H04W 4/90; H04W 76/026
(Continued)

(56) References Cited

U.S. PATENT DOCUMENTS 8,266,307 B2 * 9/2012 Strandell ................. H04L 63/18
709/229
9,843,913 B2 * 12/2017 Dahan ..................... H04W 4/90
(Continued)

OTHER PUBLICATIONS

"Digital cellular telecommunications (Phase 2+); Universal Mobile Telecommunications System UN(UMTS) ; LTE; 3G security; Access security for IP-based services (3GPP TS 33.203 version 13.1.0 Release 13)", Technical Specification, European Telecommunications Standards Institute (ETSI), 650, Route Des Luci Oles ; F-06921 Sophia-Anti Polis , France, vol. 3GPP SA 3, No. VI3 .1.0, Jan. 1, 2016 (Jan. 1, 2016), XP014266322, p. 14, paragraph 4—p. 26, paragraph 6, p. 36, paragraph 8—p. 37.
(Continued)

*Primary Examiner* — William D Cumming
(74) *Attorney, Agent, or Firm* — Michael B. Fein; Eckert Seamans Cherin & Mellott, LLC (57) ABSTRACT

A method and a system for accessing through a second mobile telecommunication network to services offered by a first mobile telecommunication network comprising the steps of: establishing a first communication channel with the second network, based on a secondary SIM card; establishing a second communication channel with the first network using the first communication channel, wherein a user of the mobile communication device is authenticated using a primary SIM card; registering, through the second communication channel, the user of the mobile communication device into the first network using the information stored in the primary SIM card; and accessing from the mobile communication device to services offered by the first network through the second communication channel.

6 Claims, 5 Drawing Sheets

(51) Int. Cl.
*H04W 12/02* (2009.01)
*H04W 76/16* (2018.01)
*H04L 29/06* (2006.01)
*H04W 4/06* (2009.01)
*H04W 88/06* (2009.01)
*H04W 48/18* (2009.01)
*H04W 72/04* (2009.01)

(52) U.S. Cl.
CPC ........... *H04L 65/1069* (2013.01); *H04W 4/06* (2013.01); *H04W 12/06* (2013.01); *H04W 88/06* (2013.01); *H04W 48/18* (2013.01); *H04W 72/048* (2013.01)

(58) Field of Classification Search
USPC ................................................. 455/411, 466
See application file for complete search history.

(56) References Cited

U.S. PATENT DOCUMENTS

| | | | | |
|---|---|---|---|---|
| 2005/0108171 | A1* | 5/2005 | Bajikar | G06F 21/31 705/51 |
| 2007/0289009 | A1* | 12/2007 | Phan-Anh | H04L 63/0281 726/12 |
| 2009/0117876 | A1* | 5/2009 | Inoue | H04W 12/06 455/411 |
| 2009/0279682 | A1* | 11/2009 | Strandell | H04L 63/18 379/201.02 |
| 2010/0041375 | A1* | 2/2010 | Osborn | H04L 63/08 455/411 |
| 2010/0041376 | A1* | 2/2010 | Osborn | H04L 63/123 455/411 |
| 2010/0041424 | A1* | 2/2010 | Osborn | H04L 63/083 455/466 |
| 2010/0048174 | A1* | 2/2010 | Osborn | H04L 63/08 455/411 |
| 2012/0142348 | A1* | 6/2012 | Park | H04W 52/0209 455/435.1 |
| 2015/0327207 | A1 | 11/2015 | Bharadwaj | |
| 2016/0366574 | A1* | 12/2016 | Dahan | H04W 4/90 |
| 2017/0195883 | A1* | 7/2017 | Kwok | H04W 12/02 |
| 2018/0109942 | A1* | 4/2018 | Lipovkov | H04W 8/183 |
| 2018/0110081 | A1* | 4/2018 | Serna | H04W 76/16 |

OTHER PUBLICATIONS

"Wi-Fi calling—extending the reach of the reach of VoLTE to Wi-Fi", 3'0 Jan. 2015 (Jan. 30, 2015), XP055251865, Retrieved from the Internet : URL:http://www.ericsson.com/res/the company/docs/ publications/ericsson review/2015/er-wifi -calling.pdf—the whole document.
International Search Report of Corresponding European Patent Application No. EP 16382468.3, dated Apr. 12, 2017.

* cited by examiner

METHOD AND SYSTEM FOR A MOBILE COMMUNICATION DEVICE TO ACCESS SERVICES

CROSS-REFERENCE TO RELATED APPLICATION

This present application claims benefit of priority from European Application No. 16382468.3, filed Oct. 14, 2016.

TECHNICAL FIELD OF THE INVENTION

Present invention generally relates to management of access to mobile communication services and more specifically to providing access to mobile communication services offered through a first mobile telecommunication network from a second telecommunication network, such as a radio data network.

BACKGROUND OF THE INVENTION

Telco companies have developed mechanisms for allowing users to access their regular telecom services over a WiFi connection while keeping their regular identity. This service is known as "WiFi calling", which is especially useful in areas with weak carrier coverage, such as residential countryside or any building with spotty reception.

WiFi calling lets people to call and text even if they do not have a phone signal just by simply connecting a mobile phone to a WiFi network. It works by opening IPSec (Internet Protocol Security) connection between the device and the Home Mobile Network, after the required authentication based on the SIM (Subscriber Identity Module), and then establishing communications based on SIP (Session Initiation Protocol). Thus, instead of using the regular carriers telecommunication network connection, users can make voice calls or texting via a Wi-Fi network. From the point of view of the user, this is actually like any other phone call, and he still uses his regular contacts. It can be set up so, in the case regular phone signal is lost, then the mobile phone will automatically switch to WiFi calling, so it is totally transparent for the user.

On the other hand, people travelling abroad who want to keep in touch, often takes more advantage from WiFi connection (when available at hotels, coffees, public squares . . . ,) than roaming plans because they mistrust about the cost and services included or they simply cannot access to their regular services. Therefore, it is obvious that users benefit from a wider area coverage thanks to WiFi calling, but they are still bound to a WiFi coverage.

For the reasons mentioned before, any solution that increases user options to access his regular mobile communications services, especially when abroad, would be a great technical improvement to the prior art.

SUMMARY OF THE INVENTION

The present invention solves the aforementioned problems by leveraging a secondary data connection provided by a secondary SIM card associated to a mobile communication device, for example a dual-SIM smartphone. Thus, a first aspect of present invention refers to a method for a mobile communication device to access through a second mobile telecommunication network (or visited network) services offered by a first mobile telecommunication network (or home network). The method comprises the steps of:

a) establishing a first data communication channel between the mobile communication device and the second mobile telecommunication network, based on information stored in a secondary SIM card associated to the mobile communication device;

b) establishing a second communication channel between the mobile communication device and the first mobile telecommunication network using the first data communication channel, wherein a user of the mobile communication device is authenticated in the first mobile telecommunication network using information stored in a primary SIM card associated to the mobile communication device;

c) registering, through the second communication channel, the user of the mobile communication device into the first mobile telecommunication network using the information stored in the primary SIM card;

d) accessing from the mobile communication device to services offered by the first mobile telecommunication network through the second communication channel.

The second mobile telecommunication network is considered to be a radio data network, such as 3G/4G networks.

In one embodiment of the invention, the step of establishing the second communication channel comprises establishing a tunnel between the mobile device and an ePDG (evolved Packet Data Gateway) network element of the first mobile telecommunication network. The tunnel between the mobile device and an ePDG network element of the first mobile telecommunication network may be a secure tunnel implemented under Internet Protocol Security (IPsec).

The authentication in the first mobile telecommunication network using information stored in a primary SIM card is regarded to comprise reading an authentication vector seed stored in the primary SIM card.

Additionally, the step of establishing a second communication channel between the mobile communication device and the first mobile telecommunication network using the first communication channel, according to one embodiment of the invention, comprises establishing a GPRS tunnel for the communication between the ePDG and a PGW (Packet Data Network Gateway) network element of the first mobile telecommunication network.

The step of registering the user into the first mobile telecommunication network, according to one embodiment of the invention comprises a SIP registration over the second communication channel. In one embodiment of the invention, said SIP registration is done in an IP Multimedia Subsystem (IMS) core of the first mobile telecommunication network. In one embodiment of the invention, the SIP registration comprises a mechanism of authentication and access control based on IMS-AKA.

Present invention considers that the secondary SIM card may be an e-SIM card embedded on a UICC chipset of the mobile communication device. In one embodiment of the invention, it is further considered providing the UICC chipset with multiple disabled mobile network operator profiles, which are enabled and disabled remotely by an operator acting on the e-SIM.

According to one particular embodiment, present invention further comprises the steps of enabling, by the user, a WiFi Calling service in the mobile communication device and selecting, by the user, a data connection based on the information stored in the secondary SIM card for registering in said WiFi Calling service, where said WiFi calling service is offered by the first mobile telecommunication network.

A second aspect of the invention refers to a system comprising:

first and a second mobile telecommunication networks;
primary and a secondary SIM cards;
a mobile device configured for
establishing a first data communication channel with the second mobile telecommunication network, based on information stored in the secondary SIM card;
establishing a second communication channel with the first mobile telecommunication network using the first data communication channel, wherein a user of the mobile communication device is authenticated in the first mobile telecommunication network using information stored in a primary SIM card;
registering, through the second communication channel, the user of the mobile communication device into the first mobile telecommunication network using the information stored in the primary SIM card;
accessing to services offered by the first mobile telecommunication network through the second communication channel.

Another aspect of the invention refers to a mobile device for accessing through a second mobile telecommunication network to services offered by a first mobile telecommunication network, wherein the mobile device is configured for:
a) establishing a first data communication channel with the second mobile telecommunication network, based on information stored in a secondary SIM card associated to the mobile communication device;
b) establishing a second communication channel with the first mobile telecommunication network using the first data communication channel, wherein a user of the mobile communication device is authenticated in the first mobile telecommunication network using information stored in a primary SIM card associated to the mobile communication device;
c) registering, through the second communication channel, the user of the mobile communication device into the first mobile telecommunication network using the information stored in the primary SIM card;
d) accessing to services offered by the first mobile telecommunication network through the second communication channel.

Another aspect of the invention refers to a computer program product comprising computer program code adapted to perform the method of present invention when said program code is executed on a computer, a digital signal processor, a field-programmable gate array, an application-specific integrated circuit, a micro-processor, a micro-controller, or any other form of programmable hardware.

Advantageously, present invention is a solution which allows a smartphone to enable WiFi calling in dual-SIM mode. The smartphone is configured so that a primary SIM is used for IPSec & SIP authentication against user HLR, but blocks data roaming on that primary SIM, and have all data to go via a secondary SIM, such as an e-SIM. In this way the user can continue to use his/her regular identity, i.e. phone number, whereas using a secondary subscription for the data traffic.

One of the main advantages of this mechanism is allowing to decouple the mobile subscription used for data connectivity purposes and the one used for the mobile communication services, that is, the one that determines the identity used, and specifically for the case these services are offered through a third party network, which in this case is other mobile network. There are a number of situations where this can be useful, such as to avoid roaming charges, to benefit from the mobile data connection with a higher performance than the one offered by the network o which the user has the primary subscription, to switch to another subscription once the user's data plan has been consumed, etc.

This also allows for instance providing efficient roaming services to the customer with local connectivity unlinked of the visited operator. The customer is not linked to the roaming agreements between its operator and the operators in the country visited, but he can use its home resources through whatever operator in the country with data services and full coverage.

Moreover, according to the particular embodiment where the secondary SIM card is an e-SIM card, it could be possible to provide clients with a more transparent and comfortable service based on disablement of pre-provisioned MNO profiles which can be remotely enabled by operators.

BRIEF DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, are drawings wherein, by way of illustration and not restrictively, the following has been represented.

DETAILED DESCRIPTION OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Present invention discloses a method for providing access to mobile communication services offered through a first mobile telecommunication network from a second telecommunication network.

Namely, present invention discloses a method for using WIFi calling approach in handsets provided with multiple-SIMs, a multiple-SIM mobile phone being a device that holds at least two SIM cards (dual-SIM), a primary SIM card and a secondary SIM card. This is useful for example when roaming, in that it allows users accessing a foreign network while keeping the existing local card. Thus, the mobile phone is set up so that a primary SIM is used for IPSec & SIP authentication against user HLR (Home Location Register), but blocks data roaming on that primary SIM, and has all data to go via secondary SIM. Therefore, the user can continue to use his/her regular identity, i.e. phone number, whereas using a secondary subscription for the data traffic, which can be useful in several scenarios, such as to avoid roaming charges, to benefit from the mobile data connection with a higher performance than the one offered by the network or which the user has the primary subscription, to switch to another subscription once the user's data plan has been consumed, etc.

The secondary SIM, according to one embodiment of the invention, is an e-SIM. Thus, one of the alternatives proposed by the present invention refers to having one physical SIM Card and one embedded SIM Card (eSIM), instead two physical SIM Cards, which allows managing in an easier and transparent way the SIM Card swap out in different countries. According to this embodiment, the primary SIM is a physical SIM card that is used for the home local operator authentication and WIFi calling authentication in the home network, but when the user is roaming with regards to that primary subscription the data connection is provided through a 3G/4G data network provided by a local operator using an eSIM as secondary SIM.

An e-SIM Card is an embedded SIM Card which can be operated remotely. Embedded SIM Card architecture allows having multiple profiles stored in the eUICC (electronic Universal Integrated Circuit Card) chipset. As an additional advantage for the service deployment based in the use of an eSIM card as secondary SIM Card, it could be to have provisioned multiple disable MNO profiles. This means that it could be possible to define alliances between operators to pre-provision some MNO profiles to provide this kind of service to the customers when they are running their handset in a visited country. Then, once multiSIM is enabled, a typical scenario could be users keeping their physical SIM for authentication with home telco, but buying local e-SIM when roaming.

Figure 1:
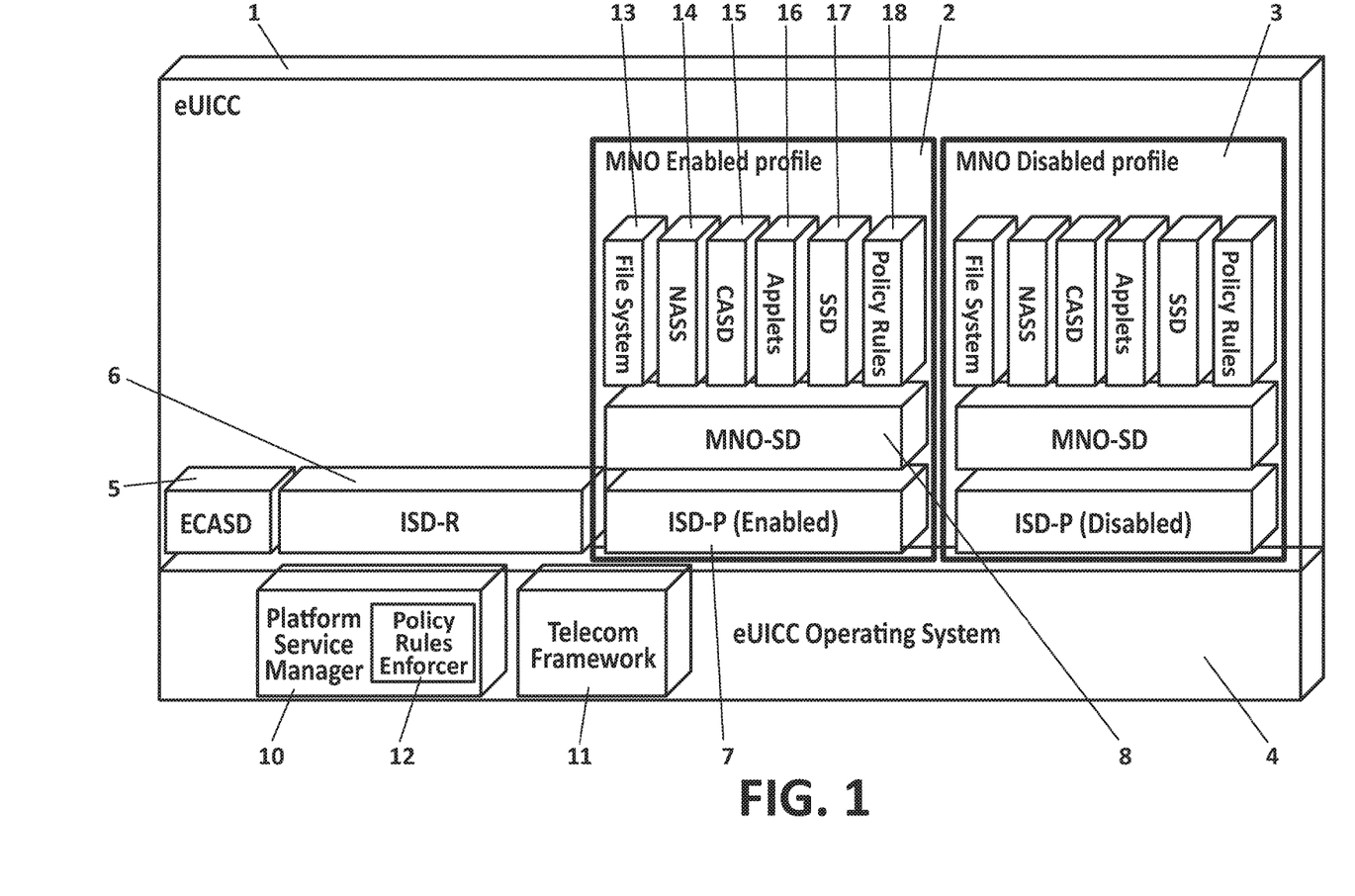
FIG. 1—shows a schematic representation of an eUICC with multiple MNO profiles provisioned.

FIG. 1 shows a schematic representation of an eUICC (1) with multiple MNO (Mobile Network Operator) profiles provisioned, both enabled profiles (2) and disabled profiles (3). It can be seen how MNO profiles of the eUICC are designed as per the state-of-the-art. Profiles are contained within security domains (SD) on the eUICC, thus making the security mechanisms of SDs available. According to GSMA's Embedded SIM Remote Provisioning Architecture:

The operating system (OS) (4) contains the basic platform features:

The ECASD (5) (eUICC Certificate Authority Security Domain): is created within an eUICC at time of manufacture and cannot be deleted or disabled after delivery.

The ISD-R (6) (Issuer security domain-Root) is the on-card representative of the SM-SR (Subscription Manager-Secure Routing) that executes the Platform Management commands. An ISD-R shall be created within an eUICC at time of manufacture, be associated to an SM-SR and not be deleted or disabled;

The ISD-P (7) (Issuer security domain-Profile) is the on-card representative of the MNO, or SM-DP (Subscription Manager Data Preparation) if delegated by the MNO. An ISD-P shall, according to GSMA's Embedded SIM Remote Provisioning Architecture:
a) Be a separate and independent entity on the eUICC
b) Contain a Profile including file system, NAAs and Policy Rules;
c) Contain a state machine related to creating, enabling and disabling the Profile;
d) Contain keys for Profile management for the loading and installation phase;
e) Implement a key establishment protocol to generate a keyset for the personalization of the ISD-P;
f) Be able to receive and decrypt, load and install the Profile created by the SMDP;
g) Be able to set its own state to disabled once the Profile is installed;
h) Provide Secure Channel Protocol 03 (SCPO3) capabilities to secure its communication with the Subscription Manager-Data Preparation (SM-DP);
i) Be able to contain a CASD. This CASD is optional within the profile and provides services only to security domains of the Profile and only when the Profile is in Enabled state.

The MNO-SD (8) is the on-card representative of the MNO. An MNO-SD shall be associated to itself, contain the MNO OTA (over-the-air) Keys and provide a secure OTA channel.

The Platform Service Manager (10) is an OS service that offers Platform management functions and Policy Rules enforcement mechanism (Policy Rules Enforcer (12)). Called by the ISD-R or ISD-P it executes the functions according to the Policy Rules. In addition it can retrieve ISD-P generic information (i.e. Profile ID, Profile State) that can be shared with authorized entities on request.

The Telecom Framework (11) is an OS service that provides standardized network authentication algorithms to the NAAs hosted in the ISD-Ps. Furthermore it provides the capabilities to configure the algorithm with the needed parameters.

An MNO profile may comprise a file system (13), NAAs (Network as a Service) (14), CASD (Certificate Authority Security Domain) (15), applets (16), SSD (solid-state drive) (17) and/or policy rules (18).

In addition to a multiSIM enabled device, present invention needs another requisite to be implemented. The device must deploy a Wifi Calling client, which means to implement the requirements specified by 3GPP for the authentication and authorization for accessing EPC (Evolved Packet Core) via an untrusted non-3GPP access network, as it is defined in the 3GPP TS 24.302, V13.5.0 (2016-03) section 6.4.

According to one embodiment of present invention, the user is allowed to choose which SIM Card for registration to the WiFi Calling service, according to a list of operators that are configured on the phone or receiving this list from the network configuration service.

In one embodiment of the invention, the software included in the smartphone handset exposes an option for user to enable WiFi calling, if it is supported for some of the operators that have issued physical SIM or eSIM enabled in the phone. If WiFi Calling service is available by more than one provider, then it would be necessary to include one additional option to select the WiFi Calling service of the operator to be connected.

WiFi calling Architecture, as defined by the GSMA, allows phone software to utilize VoIP protocols to connect to Carrier IMS network over untrusted networks, including Internet. According to a WIFi calling/ePDG architecture, once the handset is configured with EPDG & P-SCSF address, a secure IPSec tunnel is established to EPDG network element (VPN server), and then it is authenticated using SIM located in the phone (using EAP-AKA mechanism (Extensible Authentication Protocol-Authentication and Key Agreement)) (as described in 3GPP 24.302 V13.5.0 (2016-03) section 6.5.). Then, registering into the IMS core using SIP over that IPSec tunnel again using phone's SIM via IMS-AKA authentication protocol (as described in 3GPP 24.229 V13.5.1 (2016-03) section 5.1.1.2.). Finally, once the phone is registered to IMS network over IPSec, it can make and receive calls and text messages and perform other services with IMS network, in the same manner as it would do over packet-radio network such as 3G or 4G.

SIM Card Services Management

According to an embodiment of present invention the phone is set up with a specific configuration option to select which SIM card to use for the WiFi calling authentication, which means that it would be able to select the SIM card which is going to be used for the EAP-AKA and IMS-AKA authentication methods. Thus, it is possible to access to the WiFi Calling service with a different SIM Card than the native provider of the service. One of the main advantages of this functionality is to isolate the authentication method from the communication channel that in the devices of the state-of-the-art is the same, so it could be possible connect to the WiFi Calling service through all the connectivity channels available to the phone, WiFi and 3G/4G.

Therefore, a new configuration feature on the smartphone is needed to choose which data connection to choose, in case it has WiFi calling—enable secondary SIM data connection (in addition to WiFi) for WiFi calling registration, which is done by establishing IPSec tunnel to EPDG (Evolved Packet Data Gateway) (as defined in 3GPP 23.234, V12.0.0 (2014-09), section 5.7), while still authenticating using the primary SIM.

Figure 2:
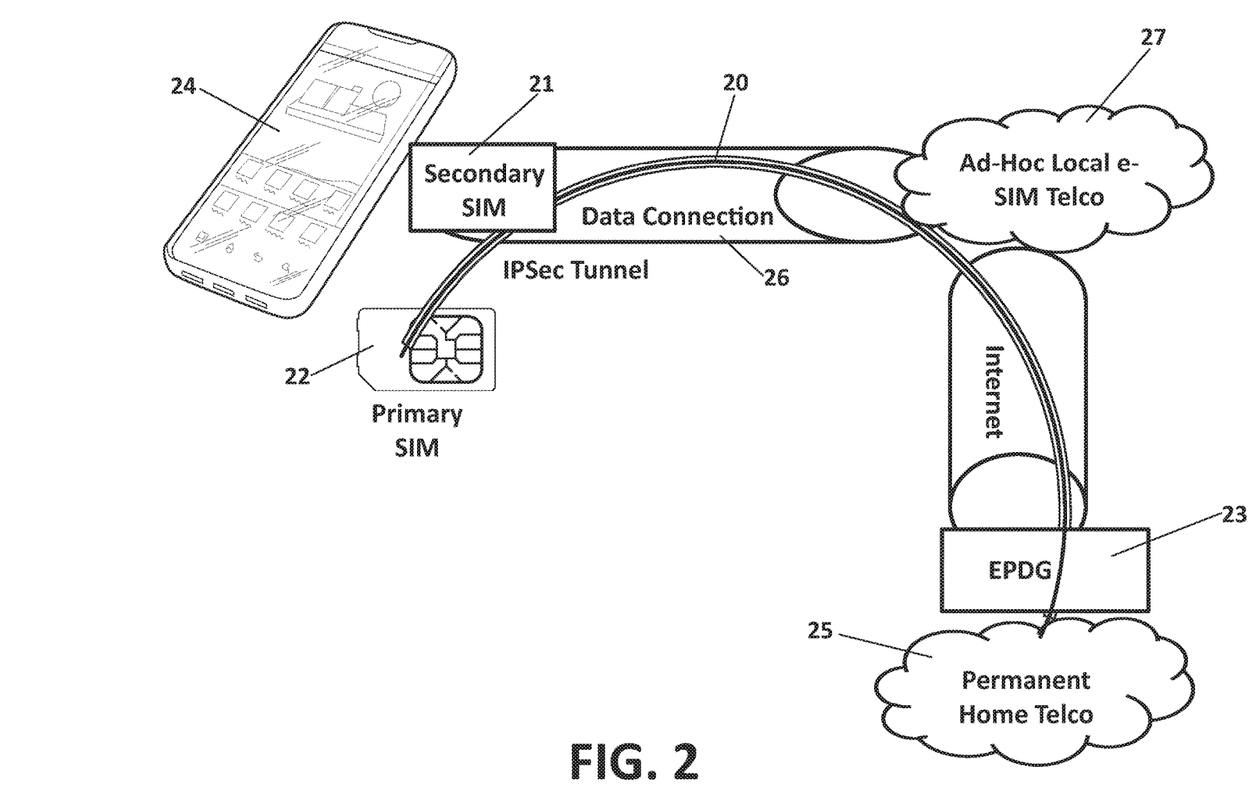
FIG. 2—shows the flow involved in a Dual SIM with WiFi calling registration, according to one embodiment of present invention.

FIG. 2 shows the flow involved in a Dual SIM with WiFi calling registration. Once the previous configuration is enabled, it will be open an IPSec tunnel (20) over the secondary SIM (21) data connection, but still using the primary SIM (p-SIM) (22) for authentication on EPDG (23) IPSec tunnel.

Once IPSec tunnel is established, the handset (24) will establish SIP registration over IPSec tunnel authentication using credentials of the primary SIM (as described in 3GPP 24.229 V13.5.1 (2016-03), section 5.1.1.2.2).

Upon successful SIP registration, user will be able to access all the voice, messaging and other telco services of the network of primary SIM's operator (25) via VoWifi service through the data channel (26) provided by the network of secondary SIM's operator (27).

As it has been mentioned before, in the case of the secondary SIM is an eSIM, the operator can pre-provision it in the smartphone's eUICC or the user can purchase it electronically online, after purchasing mobile device.

Below, it is provided the sequence diagram of the full service setup for one embodiment of the present invention. Thus, the full flow for Dual SIM devices with WiFi Calling service setup is divided in 4 different stages:

S1 channel setup, where the device establishes the LTE connectivity with the Evolved Packet Core in the Mobile Operator.

IPSec channel creation, where the device establishes the TCP (Transmission Control Protocol) connectivity with the ePDG for WiFi Calling service.

GTP (GPRS tunneling protocol) channel setup, in this stage is established the GPRS tunnel for the communication between ePDG (evolved Packet Data Gateway) and PGW (Packet Data Network Gateway), and also for the P-CSCF (Proxy-Call Session Control Function) discovery.

IMS (IP Multimedia Subsystem) registration, where the handset is registered in the IMS core to begin to use all the voice and message services.

Figure 3:
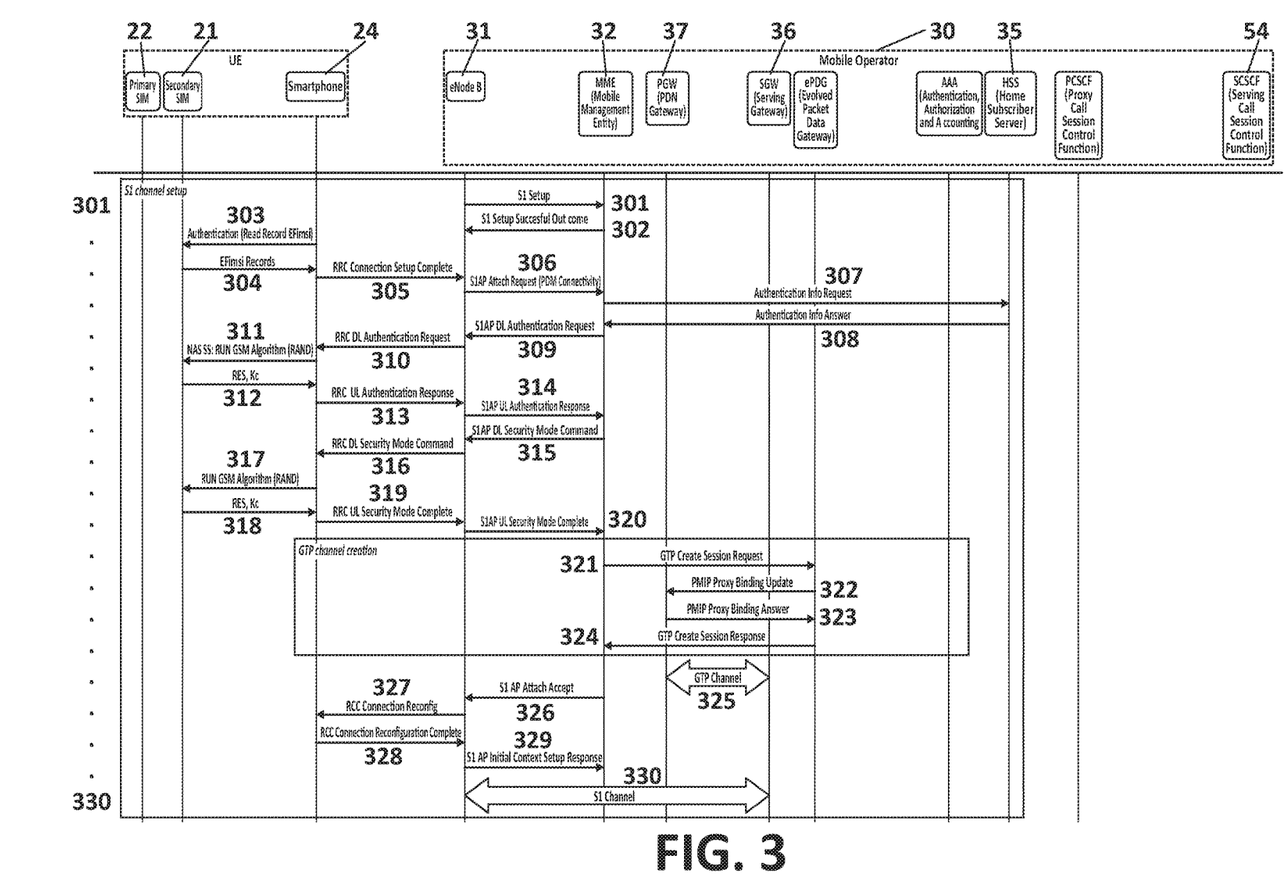
FIG. 3—shows the message sequence to establish a communication channel (S1 Channel) with the visited operator over the first mobile communication network, according to one embodiment of the invention.

FIG. 3 discloses the first stage of the full flow for Dual SIM devices with Wifi Calling service setup, according to one embodiment of the invention. Therefore, it is explained below all the message sequence (301-330) to establish the S1 Channel with the visited operator (30) which support the Data Service Channel over the first mobile communication network, in this case 3G/4G, and it is going to be used for the VoWifi service with the home operator of the subscriber.

301. The process begins with S1 Setup, where the eNB (31) is initially attached to the network. The eNB is the network element that supports the LTE air interface.

302. The Mobile Management Entity (MME) (32) registers the eNodeB succesfully. As long as the eNB is attached properly, the S1 setup will stay intact.

303. The smartphone (24) reads the authentication vector seed from the EFimsi record to be used for the S1 channel setup with the Serving Gateway (SGW).

304. The EFimsi record identifying a SIM is obtained from the secondary SIM (21).

305. Once the smartphone comes up a radio resource control (RRC) connection is established for communication with the network.

306. Smartphone then sends an attach request along with a PDN connectivity request to the network. Attach is for attaching to the network.

307. Once the MME receives the attach request, it queries the HSS for authentication details.

308. HSS (Home Subscriber Server) (35) then sends the authentication vectors to MME in an authentication info answer.

309. The network requests the smartphone for authentication vectors.

310. Sending an answer to the Smartphone with an authentication and security challenge.

311. The smartphone access to the secondary SIM to run the GSM algorithm and generate challenge answer.

312. The secondary SIM provides RES and Kc vectors for the authentication challenge.

313. Authentication answer to the challenge is sent by the eNodeB to the MME.

314. MME compares authentication parameters with what HSS has sent.

315. If the authentication vectors match, the smartphone is authenticated.

316. Success answer is sent to the smartphone for authentication.

317. A new group of authentication vectors is generated running the GSM algorithm to encrypt all the messages exchanged.

318. Authentication vectors to encrypt messages are obtained by the smartphone.

319. The smartphone sends a request to complete the security step.

320. After LTE call flow moves through the security step, the network creates the EPS bearers.

321. Once the radio bearers are created, the eNB down link addresses are sent to SGW (36) (Serving Gateway) in GTP messages.

322. For mobility functionality, PMIP (Proxy Mobile IPv6) home address and care address are allocated in the PGW (37) (PDN Gateway).

323. PMIP binding parameters are registered in the SGW.

324. At this step the GTP channel has been created and it will be used for all the communications with the SGW.

325. GTP channel has been established.

326. Then the radio bearers are created and RRC connections are modified accordingly.

327. The radio bearers are sent by the network to be modified by the smartphone.

328. The new set of bearers is reconfigured by the smartphone.

329. And the S1 channel is finally created and established.

330. S1 channel created.

Figure 4:
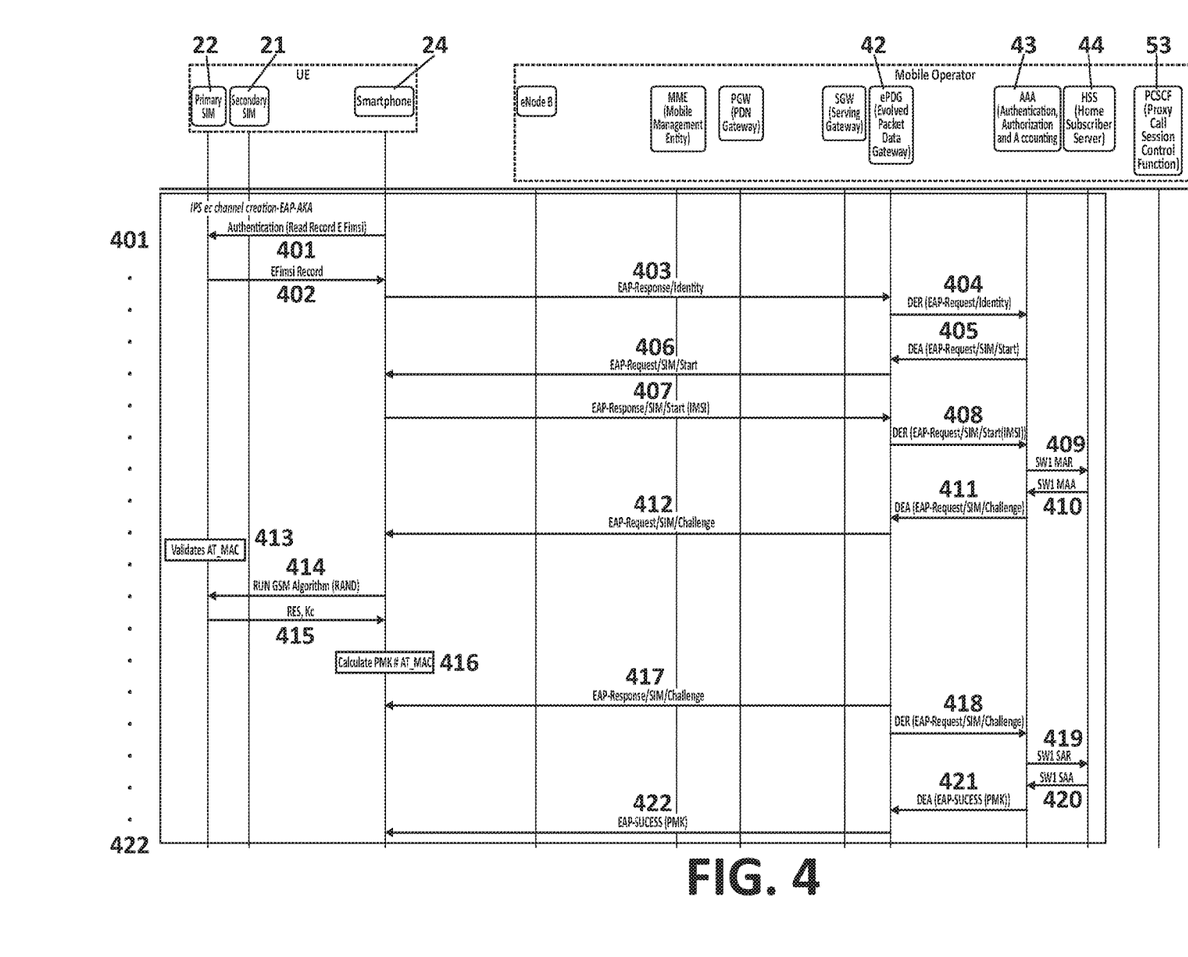
FIG. 4—shows the message sequence to establish a communication channel (IPsec tunnel) with the home operator, according to one embodiment of the invention.

FIG. 4 discloses the second stage of the full flow for Dual SIM devices with Wifi Calling service setup, according to one embodiment of the invention. Therefore, it is explained below all the message sequence (401-422) to establish the IPSec Channel with the home operator which supports the VoWifi service. In this stage, it is obtained the access to the IMS core of the home operator to use its services.

401. The smartphone (24) reads the authentication vector seed from the EFimsi record in the primary SIM (22) to be used for the IPSec channel setup with the ePDG (42) in the HPLMN (Home Public Land Mobile Network) of the subscriber.

402. In this step the authentication seed is not obtained from the same SIM card than the S1 channel.

403. The smartphone sends EAP-Response/AKA-Identity to begin the IPSec channel establishment process.

404. ePDG sends a Diameter EAP Request to the AAA (Authentication, Authorization and Accounting) server (43) to begin the authentication process with the peer.

405. AAA server response with the Identity request to the ePDG.

406. ePDG sends identity request to the smartphone.

407. The smartphone sends the identity for the authentication process, it is the IMSI (International Mobile Subscriber Identity) retrieved from the primary SIM.

408. The ePDG sends a Diameter EAP Request to the AAA to begin the authentication process for the identity provided (primary SIM IMSI).

409. The AAA Server fetches the user profile and authentication vectors from HSS (44) over SWx interface. The AAA server looks up the IMSI of the authenticated user based on the received user.

410. The HSS shall then generate authentication vectors and send them back to the AAA server.

411. AAA begins the authentication challenge and responds with a Diameter EAP Answer.

412. The ePDG responds with IKE_AUTH, according to the Internet Key Exchange protocol. The identity is the IP address of the ePDG; the AUTH payload authenticates the first IKE_SA_INIT response. The EAP message received from the AAA Server is included in order to start the EAP procedure over IKEv2.

413. Validate AT_MAC from the AAA server challenge.

414. The smartphone checks the authentication parameters and request new authentication vectors from the primary SIM to answer the authentication challenge.

415. Authentication parameters are retrieved from the primary SIM.

416. The smartphone calculates the challenge answer using PMK (Pairwise Master Key) provided by primary SIM and AT_MAC provided for the AAA server.

417. The smartphone sends the challenge answer to the ePDG.

418. ePDG sends a Diameter EAP Request to the AAA with the challenge answer (EAP payload).

419. The AAA server updates the HSS with the AAA Server Address information for the authenticated user.

420. The HSS sends the Server Assignment Answer.

421. The AAA server sends a success Diameter EAP Response to the ePDG if the subscriber is authorized for non-3GPP access.

422. ePDG sends a EAP success response and the IPSec channel is established.

Figure 5:
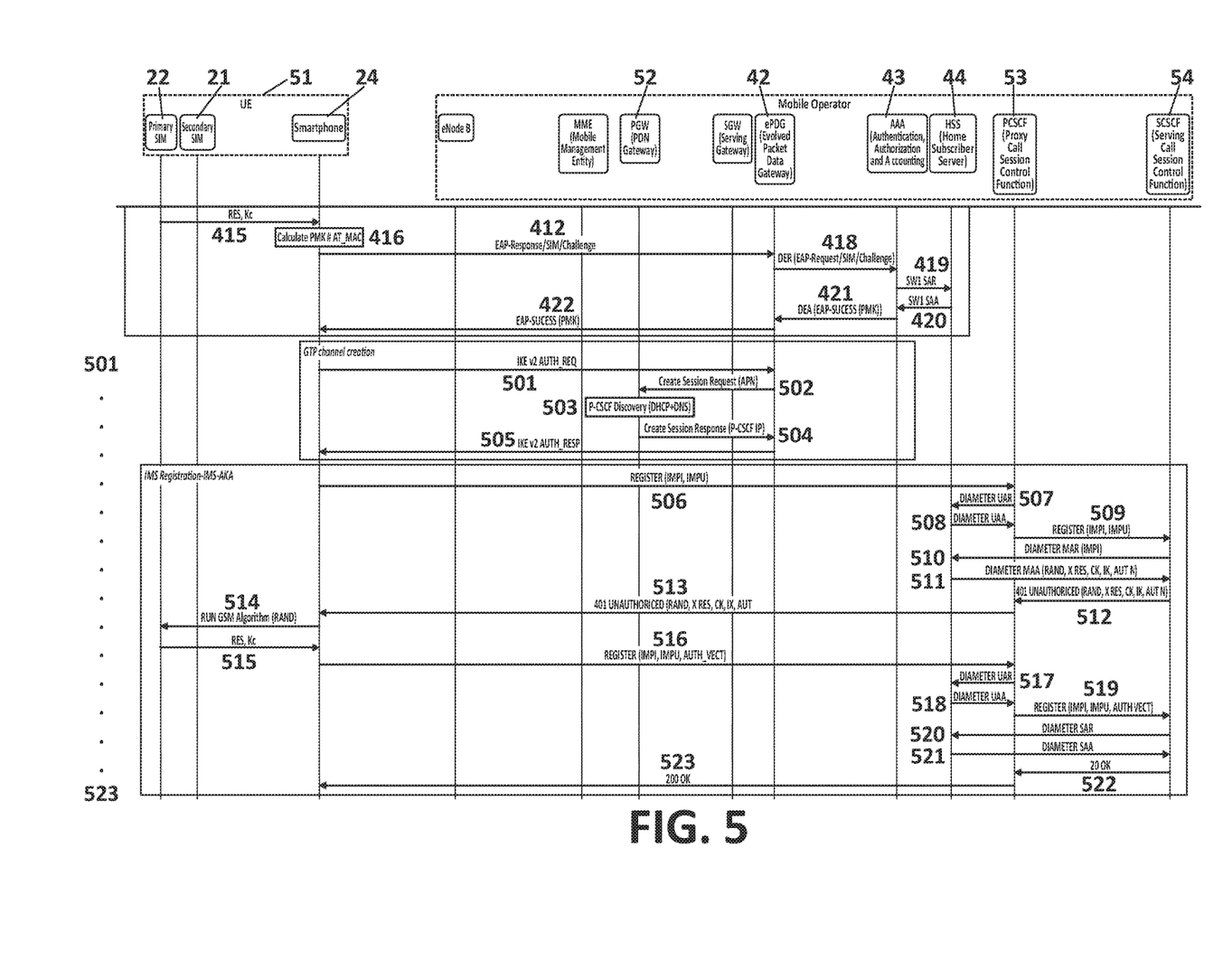
FIG. 5—shows the message sequence to set up a GTP (GPRS tunneling protocol) channel and to establish the IMS register in the IMS core of the home operator, according to one embodiment of the invention.

FIG. 5 discloses the third and fourth stages of the full flow for Dual SIM devices with WiFi Calling service setup, according to one embodiment of the invention. Therefore, it is explained below all the message sequence (501-523) to set up the GTP channel and to establish the IMS register in the IMS core of the home operator, which will allow using all the IMS services in the smartphone through the visited operator 3G/4G data services.

501. The smartphone discovers the PDN GW (Home Agent) via IKEv2 during tunnel setup. A security association is established between smartphone and PDN GW to secure the messages between UE (51) (user equipment) and PDN GW (52) and for authentication between the UE and the PDN GW. The smartphone initiates the establishment of the security association using IKEv2.

502. ePDG (42) initiates the GTP channel creation with the P-CSCF (53) through the S2b interface using the APN (Access Point Name) specified by the smartphone in the IKEv2 authentication request.

503. The Smartphone attaches to the P-CSCF prior to performing IMS registrations and initiating SIP sessions, for attachment to a given P-CSCF, the UE performs the P-CSCF discovery procedures. In these procedures, the UE first establishes the IP connectivity access network (IP-CAN) bearer. Then, the UE sends a query to the DHCP server for retrieving the IP addresses and FQDN (Fully Qualified Domain Name) of the P-CSCF. After the DHCP query, the UE performs a DNS query on the FQDN received from the DHCP server. In response to the DNS query, the IP address of the P-CSCF is returned. This is known as the DHCP-DNS procedure for P-CSCF discovery. However, in some embodiments, it may be possible that the FQDN of the P-CSCF is pre-configured in the UE. In these scenarios, the UE can directly query the DNS server and get the IP address of the P-CSCF.

504. PGW provides the P-CSCF IP address in the response to the ePDG for the GTP create session method.

505. The P-CSCF IP address is provided to the Smartphone in the response of the IKEv2 authentication request from the ePDG. At this point the GTP channel between ePDG and PGW is established and the smartphone can connect directly with the P-CSCF to begin the IMS registration.

506. All the channels are established between smartphone and IMS core network, so the IMS-AKA registration procedure is initiated and a SIP REGISTER message is sent by the smartphone with the IMPI/IMPU retrieved from the primary SIM card inserted in the device without authentication parameters.

507. P-CSCF sends a User-Authorization-Request (UAR) command to the HSS (44) in order to request the authorization of the registration of the Smartphone.

508. If the subscriber exists in the HSS a success User-Authorization-Answer (UAA) is sent to the P-CSCF.

509. After validate IMPI/IMPU in the HSS the P-CSCF forward the SIP REGISTER request to the S-CSCF (54) to begin the authentication process with the subscriber.

510. The S-CSCF sends a Multimedia-Auth-Request (MAR) command to the HSS in order to request security information for the IMPI provided by the smartphone.

511. HSS provides the authentication vectors for the authentication challenge with the smartphone.

512. The S-CSCF answers with a SIP 401 UNAUTHORIZED where the authentications vectors are placed in the payload of the message. It is the beginning of the challenge for the smartphone authentication.

513. SIP 401 UNAUTHORIZED message is forwarded by the P-CSCF to the Smartphone.

514. The smartphone runs the GSM Algorithm to generate the authentication parameters from the primary SIM using the authentication vectors provided by the HSS.

515. The authentication parameters RES and Kc to be used in the authentication challenge are obtained from the primary SIM card.

516. A new SIP REGISTER message is sent by the smartphone to the P-CSCF this time with the authentication parameters to answer the authentication challenge initiated by the S-CSCF.

517. P-CSCF sends a User-Authorization-Request (UAR) command to the HSS in order to request the authorization of the registration of the Smartphone.

518. If the subscriber exists in the HSS a success User-Authorization-Answer (UAA) is sent to the P-CSCF.

519. After validate IMPI/IMPU in the HSS, the P-CSCF forward the SIP REGISTER request to the S-CSCF to continue the authentication process with the subscriber.

520. The S-CSCF validates the authentication parameters sent by the smartphone with the authentication vectors provided by the HSS. If the authentication information matches, S-CSCF sends a Server-Assignment-Request (SAR) command in order to request it to store the name of the server that is currently serving the user.

521. If the server is stored successfully, the HSS sends a success Server-Assignment-Answer (SAA) command which contains the information that the S-CSCF needs to give service to the user.

522. The S-CSCF answers with a SIP 200 OK which means the registration process has been concluded successfully and the smartphone can begin to use call and message services in the IMS core.

523. The SIP 200 OK message from the S-CSCF is forwarded by the P-CSCF to the smartphone, at this moment the smartphone is fully operative to send SIP commands to use the IMS platform services.

Therefore, in view of the full flow for Dual SIM devices with WVfi Calling service setup disclosed above, according to one embodiment of the invention, several advantages are obtained, such as allowing to decouple the mobile subscription used for data connectivity purposes and the one used for the mobile communication services, that is, the one that determines the identity used, and specifically for the case these services are offered through a third party network, which in this case is other mobile network. This allows for instance providing efficient roaming services to the customer with local connectivity unlinked of the visited operator. Thus, the customer is not linked to the roaming agreements between its operator and the operators in the country visited, but it can use its home resources through whatever operator in the country with data services and full coverage.

Besides, based on the eSIM use it could be possible to do it in a transparent way by the operators, but this solutions is not only applicable for the eSIM use case, it could be also applicable for physical dual SIM devices, of course it is more transparent and comfortable with eSIM but it could be possible provide both flavours.

The invention claimed is:

1. A method for a mobile communication device to access through a second mobile telecommunication network to services offered by a first mobile telecommunication network, the method comprises the steps of:
    a) establishing a first data communication channel between the mobile communication device and the second mobile telecommunication network, based on information stored in a secondary SIM (Subscriber Identity Module) card associated to the mobile communication device;
    b) establishing a second communication channel between the mobile communication device and the first mobile telecommunication network using the first data communication channel, wherein a user of the mobile communication device is authenticated in the first mobile telecommunication network using information stored in a primary SIM card associated to the mobile communication device;
    c) registering, through the second communication channel, the user of the mobile communication device into the first mobile telecommunication network using the information stored in the primary SIM card;
    d) accessing from the mobile communication device to services offered by the first mobile telecommunication network through the second communication channel, wherein the authentication in the first mobile telecommunication network using information stored in a primary SIM (Subscriber Identity Module) card comprises reading an authentication vector seed stored in the primary SLM card;
    wherein the tunnel is a secure tunnel implemented under Internet Protocol Security (IPsec).

2. The method according to claim 1, wherein establishing a second communication channel between the mobile communication device and the first mobile telecommunication network using the first communication channel, further comprising establishing a GPRS (General Packet Radio Service) tunnel for the communication between the ePDG and a PGW (Packet Data Network Gateway) network element of the first mobile telecommunication network.

3. The method according to claim 1 wherein registering the user into the first mobile telecommunication network comprises a SIP (Session Initiation Protocol) registration over the second communication channel.

4. The method according to claim 3 wherein SIP registration is done in an IP Multimedia Subsystem (IMS) core of the first mobile telecommunication network.

5. The method according to claim 3, wherein SIP registration comprises a mechanism of authentication and access control based on IMS-AKA (IP Multimedia Subsystem-Authentication and Key Agreement).

6. A method for a mobile communication device to access through a second mobile telecommunication network to services offered by a first mobile telecommunication network, the method comprises the steps of:
    a) establishing a first data communication channel between the mobile communication device and the second mobile telecommunication network, based on information stored in a secondary SIM (Subscriber Identity Module) card associated to the mobile communication device;

b) establishing a second communication channel between the mobile communication device and the first mobile telecommunication network using the first data communication channel, wherein a user of the mobile communication device is authenticated in the first mobile telecommunication network using information stored in a primary SIM card associated to the mobile communication device;

c) registering, through the second communication channel, the user of the mobile communication device into the first mobile telecommunication network using the information stored in the primary SIM card;

d) accessing from the mobile communication device to services offered by the first mobile telecommunication network through the second communication channel, further comprising providing the UICC (Universal Integrated Circuit Card) chipset with multiple disabled mobile network operator profiles, which are enabled and disabled remotely by acting on the e-SIM (electronic SIM);

wherein the secondary SIM card is an e-SIM card embedded on a UICC (Universal Integrated Circuit Card) chipset of the mobile communication device.

* * * * *